March 29, 1932. G. A. BARTHOLOMEW 1,850,998
SUPERHEATING HUMIDIFIER FOR EXPLOSION ENGINES
Filed May 23, 1929
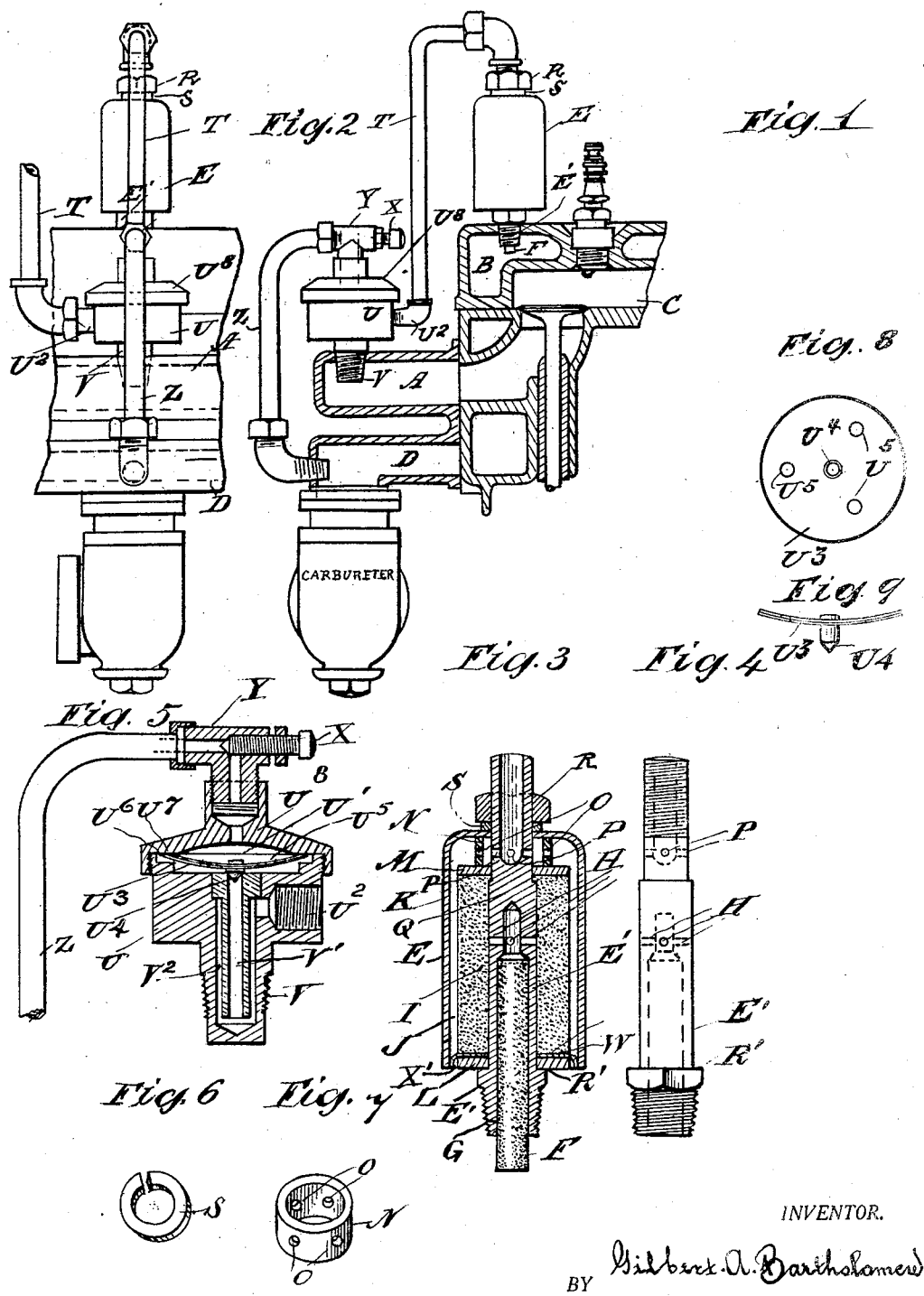
INVENTOR.
Gilbert A. Bartholomew
BY
Wm. M. Monroe
ATTORNEY.

Patented Mar. 29, 1932

1,850,998

UNITED STATES PATENT OFFICE

GILBERT A. BARTHOLOMEW, OF CLEVELAND, OHIO, ASSIGNOR TO THE MOTOR SAVER CORPORATION, OF CLEVELAND, OHIO, A CORPORATION

SUPERHEATING HUMIDIFIER FOR EXPLOSION ENGINES

Application filed May 23, 1929. Serial No. 365,399.

The general objects of the invention are to provide an attachment for the intake passage of an explosion engine, which is positioned between the carburetor nozzle and the engine cylinder and by means of which superheated air and steam from the water jacket of the cylinder are drawn into the charge, thus insuring slower combustion of the charge, freedom from knocking and smoother operation of the engine.

It is understood in starting an explosion engine, that when the engine is cold, a portion of the fuel spray will condense upon the walls of the intake manifold and will fail to enter the cylinder and hence it has been the custom to increase the fuel supply at the carburetor nozzle at that time.

But when the engine and intake manifold have become sufficiently heated, the further condensation of the fuel will cease, thereby enriching the mixture in the explosion chamber beyond the richness of the mixture when the engine is cold.

At this time there will not be a sufficient amount of oxygen supplied to complete the combustion, leaving a surplus of fuel unconsumed which would be converted into carbon in the cylinder unless provision is made to supply the necessary amount of oxygen.

To accomplish these and other valuable results, the invention comprises a device for superheating a supply of moist vapor and injecting it into the charge in the intake manifold in such a heated condition that the vapor elements will be thoroughly mixed with fuel gases.

In this manner the added moisture will be sufficient in amount to provide for slower combustion of the fuel and smoother operation of the engine.

The invention includes the combination and arrangement of parts and construction of details, hereinafter further described, illustrated in the accompanying drawings and specifically pointed out in the claim.

In the accompanying drawings Fig. 1 is a side elevation of the device; Fig. 2 is a front elevation thereof; Fig. 3 is a vertical section of the moisture purifying and evaporating device; Fig. 4 is an elevation of the integral intake tube therein; Fig. 5 is a vertical section of the humidifying device in which the air and moisture are drawn in and are superheated before they are supplied to the intake manifold of the engine. Fig. 6 is a perspective of a split washer employed upon the moisture supply pipe and Fig. 7 is a perspective of the perforated ring employed in the moisture evaporating member. Figs. 8 and 9 are plan and side elevation respectively of the thermal valve employed.

In these views A is the exhaust manifold of the motor, B is the water jacket enclosing the cylinder C, in which the water becomes highly heated. D is the intake passage for the charge.

E is the combined moisture inhaling and evaporating device shown in Figs. 1, 3 and 4.

E' is a tube containing a spongy body F through which the hot water from the water jacket is drawn at the time of drawing the charge.

This body may be composed of felt, which is inserted in the opening G in the lower end of the tube E'.

After passing through the spongy body F the moisture passes laterally through openings H, H in the walls of the tube, into and through the external annular body or sleeve I, which is also composed of a spongy substance, and the moisture in an evaporated form enters the annular air chamber J surrounding the annular spongy body, which is provided by attaching the housing K which is closed at its upper end but open below and the air and moisture pass to the tube at a point above the spongy body through lateral openings P, P.

The spongy body I is secured upon the tube by means of plates or washers, L, and M respectively, and a collar N perforated at O is also secured between the upper washer M and the top of the housing.

The lower washer L rests against the shoulder R' upon the tube.

The openings H and P are separated by means of a closure in the tube at Q.

The housing K is adjustably secured upon the tube by means of the nut R and a split washer S.

The clamping nut R also serves as an adjustment to regulate the amount of compression exerted upon the external absorbent member I, by compressing the absorbent body and lower washer against the shoulder R' upon the lower part of the tube E' and in this manner the comparative density of the material is regulated to supply moisture to the surface as fast as it can be evaporated therefrom, and thus to insure its most vaporization.

A washer W of felt, or other porous material such as cloth is placed in the annular inlet opening X' between the housing K and the lower washer L. This washer W not only serves to strain the entering air and prevent dust from entering the housing but also by its resistance to suction at the annular opening X' will cause the moisture to flow from the water jacket B through the central tube E' and through the porous bodies F and I when the engine is running.

It will be noted that the compression of the outer absorbent body I will not affect the density of the inner absorbent member or wick F which will serve as a constant feeder therefor. This member extends into the water jacket so that the circulation of water therein will keep it clean from sediment by its scouring action.

In operation, the hot moisture will be drawn through the bodies of porous felt, and a current of air will pass through the annular space about the felt, thus commingling the evaporated moisture with air, and the moistened air will pass through the openings P in the tube and will enter the supply pipe T which passes into the side of the superheating device U which is provided with the hollow projecting member V that passes into the exhaust manifold A of the engine, and is attached thereto.

The thermally controlled device for superheating the vapor of water supplied from the evaporating device and for supplying the same to the intake passage of the engine in amounts proportioned to the heat of the engine is shown in detail construction in Figs. 5, 8 and 9, and comprises a valve chamber U' communicating at U² with the vapor supply pipe T.

The bottom wall of the chamber is provided with the hollow projecting stem V which is inserted in the exhaust manifold A of the engine and conducts heat therefrom. Within this hollow stem is secured the tube V' separated therefrom at its lower end by means of the annular passage V2 which communicates with the passage U2.

The tube V' opens at its upper end into the chamber U' which is laterally expanded to receive the thermal valve U3 which is formed of thermostatic metal in two layers, the upper layer being the most expansible and begins to straighten as it becomes heated, so that the suction of the piston will raise the valve U4 from its seat and permit the passage of the superheated vapor through the openings U5 to the pipe Z leading to the intake manifold.

When the valve again cools it will again become curved and the outer edges will press against the shoulder U7 and will close the valve U4 on its seat.

The valve will rise and fall between the shoulders U6 and U7 formed between the body U and the cover U8 of the chamber.

A second valve X in a union Y in the pipe Z leading to the intake manifold D forms additional means for controlling the passage of superheated vapor to the intake manifold.

The operation of the device may be described as follows:

After the motor has become heated to the point that there is no further deposit of fuel oil by condensation upon the walls of the intake passage, the superheating device will commence to operate, and permit the admission of moist vapor into the intake manifold.

This valve will open and close as often as the motor becomes heated and cools again and will open more quickly in hot weather.

This variation under variations of atmospheric temperature is desirable, since the colder the weather and the colder the motor, the richer the mixture will be, since cold air in winter passing through the evaporator will not absorb as much moisture as will hot air in summer when a greater amount of moisture is required.

The operation of the motor will also be more nearly uniform in hot or cold weather, since in winter the gasoline is not as quickly evaporated as in summer, but when the hot vapors from the superheater are commingled therewith, the gasoline or other fuel will be immediately vaporized and put into condition for explosion in the cylinder.

More oxygen also leaves the cylinder clean and in readiness for starting at any time. Also more oxygen provides a safeguard for the driver, since if surplus fuel should be supplied at any time the action of the device will supply more oxygen and hence will insure a more perfect combustion.

When coasting and the spark is shut off the humidifier passage will act as a relief valve and less fuel will be wasted.

Having described the invention what I claim as new and desire to secure by Letters Patent is:

In a humidifying device for an internal combustion engine, in combination with the intake manifold and water jacket thereof, a casing attached to the water jacket, a porous water absorbing member within said casing and inserted in a tubular connection leading to said water jacket, a second porous water absorbing member surrounding said first water absorbing member, passageways between the two members, air inlet means adjacent said second water absorbing member, a connecting passage way from the casing to the intake manifold and a valve housing forming a portion of said passageway and containing a bi-metallic perforated valve disc operating an attached needle valve for controlling said passageway, a portion of said valve housing an extension forming a connecting loop and inserted in the exhaust manifold of the engine.

In testimony whereof I affix my signature.

GILBERT A. BARTHOLOMEW.